(No Model.)
T. BRIGGS.
BRAKE FOR VEHICLES.
No. 332,482.  Patented Dec. 15, 1885.
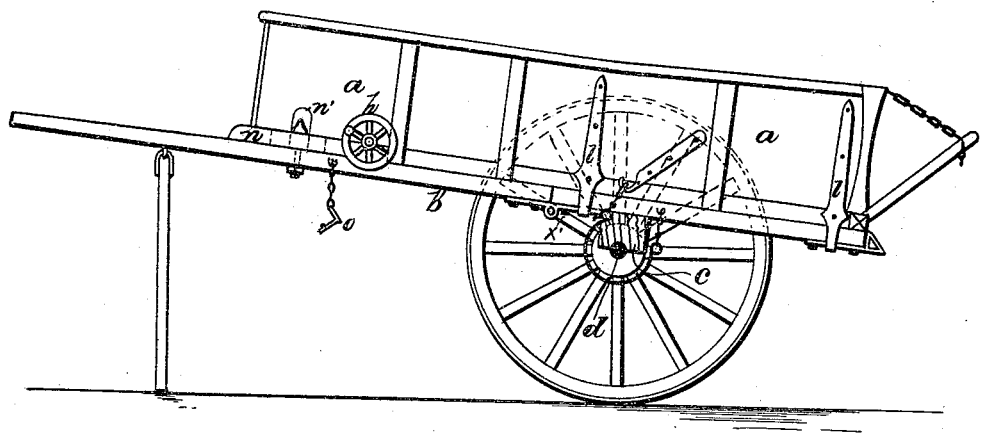
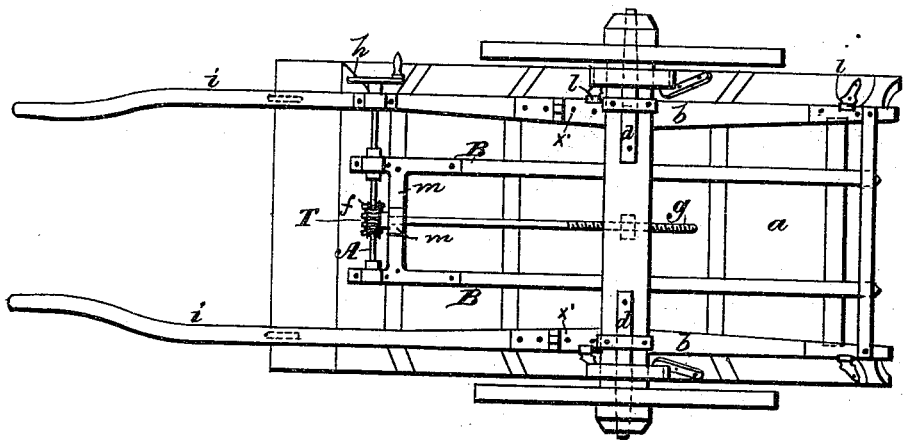
Witnesses.
Robert Everett.
Geo. W. Rea
Inventor:
Thomas Briggs.
By James L. Norris
Atty.

(No Model.)  2 Sheets—Sheet 2.

T. BRIGGS.
BRAKE FOR VEHICLES.

No. 332,482.  Patented Dec. 15, 1885.

Witnesses.
Robert Emett
Geo. W. Rea

Inventor:
Thomas Briggs.
By James L. Norris.
Atty.

UNITED STATES PATENT OFFICE.

THOMAS BRIGGS, OF DARWEN, COUNTY OF LANCASTER, ENGLAND.

BRAKE FOR VEHICLES.

SPECIFICATION forming part of Letters Patent No. 332,482, dated December 15, 1885.

Application filed September 15, 1885. Serial No. 177,168. (No model.) Patented in England August 25, 1883, No. 4,112.

*To all whom it may concern:*

Be it known that I, THOMAS BRIGGS, a subject of the Queen of Great Britain, residing at 11 Trinity Terrace, Darwen, in the county of Lancaster, England, have invented new and useful Improvements in the Construction of Carts, Carriages, and other Vehicles, (for which I have obtained patent in Great Britain, No. 4,112, August 25, 1883,) of which the following is a specification.

Figure 3:
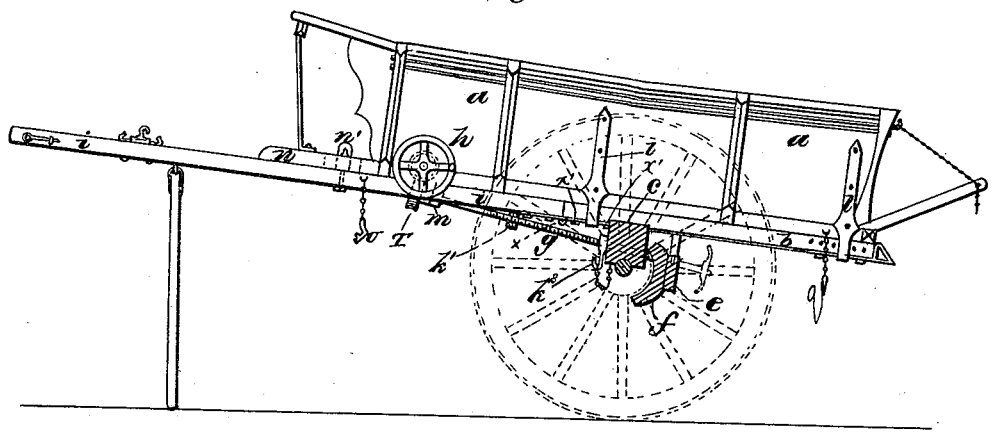
Figure 4:
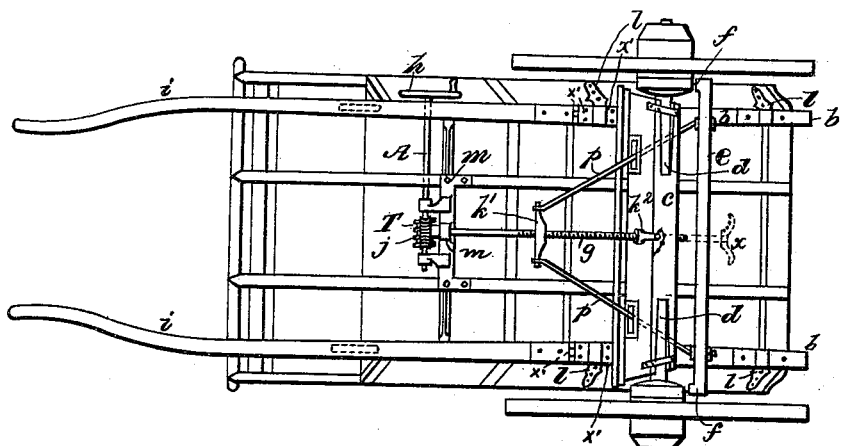

Figure 1 is a side elevation of a cart made on my improved principle. Fig. 2 is a plan showing under side of same. Fig. 3 is a side elevation of my improvements applied to carts wherein the present or old brake is employed, and Fig. 4 is a plan of the under side of same.

The body $a$ $a$ of the vehicle is formed to slide (by means of a screw or other equivalent) upon the frame-work $b$ $b$, fixed on the axle-tree bed $c$ $c$, beneath which the axle $d$ $d$ is mounted, in the usual manner. Through the axle-tree bed $c$ $c$ and brake cross-bar $e$ $e$, I bore a hole, and the screw $g$ $g$ passes loosely through both, as in Fig. 4. The other end passes forward and loosely through the bracket $m$ $m$, which is bolted firmly to the mid-feathers or frame-work of the cart. The screw $g$ $g$ is provided with two nuts, $k'$ and $k^2$, and with a wheel, T. A worm, $j$, is geared into this wheel by means of the cross-shaft A, which is bolted to the top ends of the mid-feathers B, which are turned by the hand-wheel $h$ $h$, or other suitable turning device, or, as shown, by the handle $x$ underneath and behind the cart. (Indicated by dotted lines.) When going downhill, this hand-wheel or other device is turned so that the nut $k'$ travels up the thread of the screw $g$ $g$ and pulls on the brake $f f$ with the two rods $p$ $p$, which pass loosely through the axle-tree bed and unite the nut $k'$ and brake $f f$ firmly together. The screw $g g$ is then caused to turn farther round, and consequently travels back in the thread of the nut $k'$ and draws the body $a$ $a$ of the vehicle backward, thus throwing the weight of the vehicle and its load back and relieving the horse at the same time that the brake $f f$ has been firmly applied. The nut $k^2$, being unable to turn on the rod or screw $g$ $g$, remains near to the axle-tree bed $c$ $c$, and the screw travels back through it; but on turning the screw in the reverse direction to take the brake off and move the weight of the load back to its former position this nut $k^2$ moves sufficiently to come into close contact with the axle-tree bed, and the screw $g g$ works in the thread of this nut $k^2$ and moves forward the weight of the load; or a nut may be placed on this screw on either side of the axle-tree bed, so that if the brake were out of order or being repaired the balancing arrangement can be used, as before described; or, for light work, I introduce a strap, chain, or band, as before mentioned, and simply attach one end to the frame-work $b$ $b$, as shown at Fig. 1, and the other end to the moving body of the cart $a$, in which case I provide an eyebolt through the bed of the cart to substitute the nuts $k'$ and $k^2$, so that when the body of the same is moved backward the brake C in Fig. 1 is applied to the wheel, and by simply reversing the handwheel the load is balanced and the brake taken off. When about to go up a hill or incline, the hand-wheel $h$ $h$ is turned still further, so that the weight of the vehicle and its load is moved forward on the horse's back without applying the brake. The extent of the sliding motion to be imparted to the body is limited by the bolt-heads securing the shaft-hinges $x'$ $x'$, between which slide L-shaped supports $l l$, fixed to the body of the cart. The pin $n'$, which holds the body to the shafts, works in slots of suitable length in each of the projecting arms $n$ $n$ of the cart-body. The key $o$ $o$ holds these arms down on the shafts $i$ $i$, and by placing a pin, as at $q$ $q$, on either side of the cart in the holes indicated in the frame $b$ $b$—one on each side of the support $l$ $l$—the cart will be held in any position when required, and will then become like an ordinary cart with an ordinary brake.

Having thus described my invention, I would here remark that, without departing from the principle of the same, other methods may be adopted for moving the body of the vehicle backward or forward.

What I claim as new, and desire to secure by Letters Patent, is—

1. The combination, in a cart, of the supporting-frame, a longitudinally-sliding body, and a brake actuated by the rearward-sliding movement of the body to apply the brakes, substantially as described.

2. The combination, in a cart, of the supporting-frame, the longitudinally-sliding body, and a brake applied to the wheels by the rearward-sliding movement of the body, and removed from the wheels by the forward-sliding movement of said body, substantially as described.

3. The combination, in a cart, of the supporting-frame, the longitudinally-sliding body, and the brake-band secured at one end to the frame and connected at its other end with the sliding body, for applying the brake-band to the wheel-hub by the rearward-sliding movement of the body, substantially as described.

In witness whereof I, the said THOMAS BRIGGS, set my hand this 21st day of August, A. D. 1885.

THOMAS BRIGGS.

Witnesses:
E. CHADWICK,
E. A. CHADWICK.